United States Patent Office 3,423,376
Patented Jan. 21, 1969

3,423,376
AIR-CURABLE SEALANT AND CAULKING COMPOSITION
Riad H. Gobran, Levittown, and Anthony F. Santaniello, Trenton, N.J., and Michael P. Mazzeo, Brooklyn, N.Y., assignors to Thiokol Chemical Corporation, Bristol, Pa., a corporation of Delaware
No Drawing. Continuation-in-part of application Ser. No. 299,093, July 31, 1963. This application Dec. 28, 1965, Ser. No. 517,096
U.S. Cl. 260—80.3        11 Claims
Int. Cl. C08f 25/00, 27/14

ABSTRACT OF THE DISCLOSURE

Air-curable sealant and caulking compositions of the "one-package" type are disclosed which are based on liquid interpolymers that are the product of the addition polymerization of (A) from 85 to 98 mol percent of ethylenically unsaturated silicon-free, monomeric material, at least half of which is an elastomer precursor and (B) from 2 to 15 mol percent of at least one monomer which is a silane having attached to the silicon atom thereof (1) an ethylenically unsaturated aliphatic hydrocarbon radical of 1 to 4 carbon atoms, (2) from 1 to 3 radicals having sites for cross-linking and selected from acyloxy and alkoxy radicals having 1 to 4 carbon atoms and (3) at most two innocuous hydrocarbon radicals of 1 to 8 carbon atoms as required to make a total of four radicals attached to the silicon atom. The sealant compositions may contain the usual additive ingredients such as pigments, plasticizers, anti-oxidants, ultra-violet absorbers and fillers, as well as curing catalysts. They are curable by atmospheric moisture to form elastomeric seals.

---

The present application is a continuation-in-part of our application Ser. No. 299,093, filed July 31, 1963, now abandoned. This invention relates to sealant and caulking compositions for bonding wood, metal, glass, ceramics or cement to the same or dissimilar materials and more particularly to "one-package" compositions of this type that are air-curable to form a rubbery bond.

In certain types of sealant applications the parts that are bonded together are subsequently subjected to forces that tend to produce relative movement of a vibratory nature, and it has been found that in such applications a durable seal can be achieved only if the bond possesses a considerable measure of elasticity. For example, exterior window panes sealed in metal frames, especially the relatively large panes of glass frequently used in office buildings, are subjected to the forces of wind, rain, sleet and the like which tend to produce relative movement of the glass pane and metal frame, and it has been found that for this application elastomer-based bonds have a substantially longer life.

In general, the sealant compositions that have previously been proposed for applications of this type have been of the "two-package" type wherein one package contains a liquid prepolymer that is an elastomer precursor and the other contains a curing agent capable of converting the liquid prepolymer to an elastomer. Conventional additives such as curing catalysts, pigments, plasticizers, fillers and the like are incorporated in one or both packages. The two packages are mixed to bring the curing agent into reactive contact with the prepolymer shortly before application of the sealant.

Such a "two-package" system has the obvious disadvantage that an inexperienced applicator may fail to mix the two parts adequately or mix them in the wrong proportions. Hence efforts have been made to develop air-curable "one-package" systems which when packaged in a hermetically sealed container in the absence of air and moisture remain stable in storage and when exposed to the atmosphere cure in an acceptably short period of time to form a rubbery seal. In general, the previously proposed one-package systems have been based on special types of prepolymers and thus the range of properties that can be achieved therewith has been somewhat limited. So far as we are aware, it has not previously been possible to utilize as the basis for such a one-package system a liquid prepolymer largely composed of the common ethylenically unsaturated elastomer precursors such as the lower alkyl acrylates, isoprene, chloroprene, isobutylene and butadiene which are convertible to rubbers having a wide range of properties.

It is accordingly an object of the present invention to provide an improved sealant and caulking composition which in moisture-free condition remains stable in storage and which is air-curable to form a rubbery seal. It is a further object of the present invention to provide a sealant and caulking composition of this type that is based on a liquid prepolymer largely derived from one or more monomers that are ethylenically unsaturated elastomer precursors. Other objects of the invention will be in part obvious and in part pointed out hereafter.

The objects and advantages of the present invention are achieved in general by using as the base for a sealant and caulking composition an interpolymer of one or more ethylenically unsaturated elastomer precursors and a minor amount, i.e., about 2 to 15 mol percent, of a monomer that is a silane having sites that are reactive with atmospheric moisture to cross-link the interpolymer. The silanes useful in preparing the present interpolymers are characterized by the fact that they have attached to the silicon atom thereof (1) an ethylenically unsaturated aliphatic hydrocarbon radical of 1 to 4 carbon atoms, (2) from one to three aliphatic radicals having an oxygen-containing segment providing a site for cross-linking and selected from the group consisting of acyloxy and alkoxy radicals having 1 to 4 carbon atoms and (3) one or more innocuous hydrocarbon radicals of 1 to 8 carbon atoms as required to make a total of four radicals attached to the silicon atom. Typical examples of organo-silanes falling within the scope of the foregoing definition are: vinyl dimethyl ethoxysilane; vinyl triethoxysilane; vinyl triacetoxysilane; vinyl phenyldiethoxysilane; vinyl diphenylethoxysilane; allyl triethoxysilane; vinyl tributoxysilane; crotonyl triethoxysilane; β-chloromethallyl triethoxysilane; vinyl trimethoxysilane; allyl diethoxyethylsilane; vinyl dimethoxymethylsilane; and methallyl methoxymethylsilane. Compounds containing unsaturated norbornyl groups such as 2-triethoxysilyl bicyclo (2,2,1) hept-5-ene are also useful in preparing the products of the present invention.

The ethylenically unsaturated elastomer precursors are well known in the art per se and comprise such monomeric materials as the lower alkyl acrylates, e.g., methyl, ethyl, butyl and 2-ethylhexyl acrylates, butadiene, isoprene, chloroprene and isobutylene. For present purposes the lower alkyl acrylates are preferred. The elastomer precursors useful in preparing interpolymers to be employed as a base for the present sealant compositions may be generally characterized as silicon-free ethylenically unsaturated monomeric materials. About 85 to 98 mol percent of such monomers may be used to prepare the interpolymers.

It has been found that the charge of silicon-free unsaturated monomeric material to be interpolymerized with the silane need not be entirely composed of elastomer precursors but rather that its composition may comprise up to one half of other unsaturated monomers that do not interfere with the attainment of the desired elastomeric properties of the cured sealant. These other monomers may be, for example, vinyl fluoride, vinylidene fluoride, tetrafluoroethylene, vinyl chloride, vinylidene chloride, vinyl acetate, styrene, acrylonitrile, methacrylonitrile, methacrylate, esters, acrylamide, methacrylamide and maleic anhydride. Thus the silicon-free, ethylenically unsaturated monomeric material may contain up to about 43 to 49 mol percent of nonelastomer precursor. The preferred amount of elastomer precursor in the silicon-free, ethylenically unsaturated monomeric material is about 75 to 100 mol percent.

In preparing the interpolymers used as a base for the sealant compositions of the invention, from 2 to 15 mol percent of the silane monomer is reacted with 85 to 98 mol percent of the silicon-free ethylenically unsaturated monomer. In general, the present interpolymer can be made by processes known to be useful for the polymerization of ethylenically unsaturated monomers. Thus the polymerization is conveniently carried out in the presence of an initiator such as azobisisobutyronitrile or in the presence of organic or inorganic peroxides. Examples of such peroxides are benzoyl peroxide, tertiary butyl perbenzoate, and acetyl, stearyl and lauryl peroxides. Typically the initiator is used in an amount of say 0.25% to 5% of the total weight of monomer.

Anionic initiators (e.g. lithium, sodium, lithium alkyls, etc.) can also be used when monomers such as butadiene or isoprene constitute the silicon-free ethylenically unsaturated monomers. In such cases the molecular weight of the product can be controlled by varying the ratio of initiator to monomer, as well as by selection of the proper temperature.

When isobutylene is the major elastomer precursor used, the preferred initiator is one of the cationic type, (e.g., ferric chloride, stannic chloride, aluminum chloride, etc.). Control of molecular weight in this case can be accomplished by adjusting the temperature of polymerization and/or by use of chain transfer agents.

Many of the monomers described in this application may also be polymerized using radiation as the initiation mechanism, e.g. —(gamma) radiation or UV radiation.

The polymerization may be conducted in bulk or in an inert solvent, e.g., benzene, toluene, or xylene at the appropriate temperature for the decomposition of the initiator used. The rate of polymerization is accelerated at higher temperatures and this usually results in a reduction in the molecular weight of the product polymer. This regulation of molecular weight is helpful in controlling the viscosity of the interpolymer to produce a liquid product having the desired properties for use in the present compositions. A small amount of a molecular weight modifier or transfer agent may also be usefully employed to control the molecular weight of the product. Typical chain transfer agents useful in preparing the present interpolymers are butyl mercaptan, hexyl mercaptan and t-dodecyl mercaptan.

The liquid interpolymers as prepared above can be cross-linked to form rubbery products by a moisture-induced reaction between the alkoxy or acetoxy groups provided by the silane monomer. When the interpolymer contains acetoxy groups, curing can be effected at room temperature without the use of a catalyst; whereas when curing is effected by means of alkoxy groups, a curing catalyst is preferably used. The amount of moisture needed to effect the cure depends on the number of cross-linkable sites in the interpolymer chains.

The sealant compositions of the invention are formulated by using a liquid interpolymer prepared as described above as the base therefor, and incorporating with the interpolymer various additives of the type known in the art to be useful in sealant compositions. Such additive ingredients may include, in addition to a curing catalyst if needed, pigments, plasticizers, antioxidants and ultra-violet absorbers. Also fillers such as, for example, alpha cellulose, carbon black, mica dust, titanium dioxide, talc, zinc oxide, magnesium oxide, asbestos, quartz, wood flour, cellulose or wool fibers and the like may be incorporated in the compositions. The selection of the type and amount of the additives used depends upon the properties desired in the final product. The criteria for determining the kind and amount of additives to be used are known to those skilled in the art.

As indicated in the specific examples given hereafter, a wide variety of curing catalysts can be used in the present compositions, and may be incorporated therein to the extent of say 1% to 10% by weight based on the weight of the interpolymer. In cases where curing is effected through alkoxy groups of the interpolymer, the preferred catalyst is a Lewis acid type catalyst. Such Lewis acid catalysts may be, for example, 10% stannic chloride in acetic anhydride, tetrabutyl titanate, or zinc chloride. Compositions incorporating such catalysts, when stored under anhydrous conditions, have excellent shelf life. Upon exposure to moisture, the mixture begins to cure and forms a tack-free skin within about 24 hours, and yields a complete cure within 5 to 6 days at room temperature. The amount of moisture in the atmosphere is usually sufficient for this purpose. Under low humidity conditions, the cure will take longer. However, if desired, the cure can also be accelerated by heating the mixtures with or without the use of a catalytic agent. The adhesive properties of these sealant compositions can be improved by applying suitable priming coatings to the substrate surfaces or by adding to the sealant compositions adhesive additives such as epoxy resins and other materials known to the art to be useful for this purpose.

The metal salts of carboxylic acids are also useful for curing the polymer of the present invention and especially useful in curing those polymers containing acetoxy groups. These catalysts are available commercially, usually in a 6% solution. The metal portion of the carboxylic acid salts is chosen from such elements as tin, iron, lead, nickel, cobalt and chromium; tin salts are preferred. Among the more useful compounds are stannous oxalate, tin octoate, dibutyl tin dilaurate, iron octoate, lead octoate, nickel oxalate, cobalt succinate and chromium octoate. For ease of distribution throughout the polymer mass, liquid members of this group of catalysts are preferred. As indicated by the examples given below, alkanedione-metal complexes are also useful as curing catalysts in the present compositions.

In order to point out more fully the nature of the present invention, the following specific examples are given of illustrative embodiments of the present compositions and of the preparation of various interpolymers useful therein. Except where otherwise specified, the tabulated data in the examples are for physical properties of the cured products measured after a room temperature (R.T.) cure for 8 to 10 days, and after a post-cure at 175° C. for 72 hours. The properties measured were tensile strength in pounds per square inch (tensile), elongation in percent (elongation), and hardness measured on a Shore A durometer 80 (hardness).

Example 1

Two samples were run following this procedure:
To a 1-liter, 3-neck, round-bottom flask equipped with a stirrer, thermometer, reflux condenser and a CaCl$_2$ drying tube there was added 190 grams (1 mol) of vinyl triethoxysilane and 1600 ml. of toluene. The solution was heated to 110° C., whereupon 800 grams of ethylacrylate (8 mols), 208 grams of styrene (2 mols), 12 grams of benzoyl peroxide, and 11.98 grams of t-dodecyl mercaptan were added to the solution over a period of three hours. When the addition was completed, the temperature of the reactants was lowered to 98° C. and maintained at this temperature for two hours. A second addition of 6 grams of benzoyl peroxide dissolved in toluene was then added to the mixture, and the mixture was heated for three additional hours at 98° C. The solvent and unreacted monomers were evaporated at a pressure of 2 mm. Hg absolute. The temperature was about 50° C. during this stripping process. The samples were combined and held under vacuum until the interpolymer cooled to room temperature. This procedure yielded 1857 grams of viscous interpolymer, indicating a 77.5% conversion of reactants.

Each of sixteen portions of this interpolymer was compounded on a paint mill with 20 parts by weight of a white titanium oxide pigment marketed under the trade name Titanox AMO, 25 parts by weight of precipitated calcium carbonate marketed under the trade name Witcarb RC, 3 parts by weight of dibutyltindiacetate and the varying amounts of different plasticizers specified in Table A below. After the compounding, a portion of the material was packaged in tubes and the rest cast into sheets.

The tubes were stored for a period of about a month and then samples were extruded therefrom and permitted to cure in contact with the atmosphere. The extruded samples became tack-free in about a day. The curing time varied as indicated in the second column of Table A headed "C.T."

The materials that had been cast into sheets were cured by exposure to the atmosphere for 7 days at room temperature, and their physical properties were then determined with the results tabulated in Table A. In the table the headings refer to the following measured properties: H represents Duro A hardness data; E is percent elongation; Te is tensile strength, p.s.i.; M is modulus, p.s.i.; Tr is tear resistance; and L.T.P. represents the low temperature properties in terms of G 10,000, i.e., the temperature at which the torsional modulus of the material is 10,000 p.s.i.

TABLE A

|  | Days C.T. | H | E | Te | M | Tr | L.T.P |
|---|---|---|---|---|---|---|---|
| None | 1 | 53 | 110 | 360 | 300 | 23 | +10 |
| Dibutylcarbitol adipate: | | | | | | | |
| 20 parts | 6 | 28 | 100 | 152 | 152 | 10 | −36 |
| 40 parts | 6 | 20 | 82 | 55 | | 0.35 | −72 |
| Tributoxyethyl phosphate: | | | | | | | |
| 20 parts | 5 | 18 | 130 | 75 | 60 | 0.64 | −50 |
| 40 parts | 6 | 10 | 160 | 45 | 30 | 0.45 | 0 |
| Butyl acrylate: | | | | | | | |
| 20 parts | 6 | 35 | 80 | 330 | | 18.8 | −5 |
| 40 parts | 1 | 36 | 100 | 440 | 400 | 15.5 | −5 |
| Methyl methacrylate: | | | | | | | |
| 20 parts | 1 | 41 | 80 | 260 | | 18.8 | +17 |
| 40 parts | 1 | 36 | 111 | 475 | 450 | 20.8 | +16 |
| Dibutylphthalate: | | | | | | | |
| 20 parts | 6 | 33 | 115 | 225 | 200 | 10 | −30 |
| 40 parts | 6 | 21 | 80 | 82 | | 3.8 | −51 |
| Dipropylene glycol dibenzoate: 40 parts | 6 | 22 | 100 | 115 | 115 | 7.5 | −33 |
| Chlorinated diphenyl: 40 parts | 6 | 23 | 85 | 126 | | 5.5 | −14 |
| Polypropylene glycol: 40 parts | 1 | 46 | 103 | 195 | 177 | 20 | +10 |
| Polybutyl acrylate: 40 parts | 1 | 40 | 113 | 195 | 147 | 19 | 0 |
| Butylacrylate acrylonitrile copolymer: 40 parts | 3 | 40 | 100 | 265 | 265 | 16 | −5 |

Example 2

A part of the vinyl triethoxysilane-styrene-ethyl-acrylate polymer prepared as in Example 1 was divided into ten-gram samples and each sample was mixed with an organo-metallic compound, a metal salt of a carboxylic acid or an alkanedione complex, to test the catalytic properties of the compounds at about 25° C. The times required of each polymer sample to gel and to "set," i.e., reach the rubbery state, were noted. The test was discontinued after 30 days. The following results were obtained:

| Catalyst | Catalyst (grams) | Gel Time (hours) | Set Time |
|---|---|---|---|
| Nickelous pentanedione complex | 0.5 | 3½ | No set. |
| Manganese pentanedione complex | 0.5 | 3½ | 2 weeks. |
| Stannous oxalate | 0.5 | 3½ | Overnight. |
| Zinc octoate | 0.18 | 3½ | No set. |
| Lead octoate | 0.25 | 3½ | 1 week. |
| Tin octoate | 0.5 | <1 | 1 hour. |
| Ferric naphthenate | 0.06 | 3 | No set. |
| Zinc naphthenate | 0.1 | 3 | Do. |
| Lead naphthenate | 0.24 | 2 | 2 weeks. |
| Manganese naphthenate | 0.06 | 2 | No set. |
| Nickel naphthenate | 0.06 | 2 | Do. |
| Dibutyl tin dilaurate | 0.5 | 2 | Overnight. |
| Iron octoate | 0.06 | 72 | 96 hours. |
| Do | 0.6 | <72 | 72 hours. |
| Nickel oxalate | 0.5 | overnight | 48 hours. |
| Cobalt succinate | 0.5 | overnight | Do. |
| Chromium octoate | 0.05 (Cr) | 48 | <96 hours. |

Example 3

To a 1-liter, 3 neck, round-bottom flask equipped with a stirrer, thermometer, reflux condenser, and a $CaCl_2$ drying tube, there was added 47.5 grams (0.25 mol) of vinyl triethoxysilane dissolved in 800 ml. of toluene. The solution was heated to 110° C., whereupon 250 grams (2.5 mols) of ethylacrylate and 0.50 gram of benzoyl peroxide were added to the solution over a period of three hours. When the addition was completed, the pot temperature was lowered to 98° C. and maintained at this temperature for 2 hours. A second addition of 0.21 gram of benzoyl peroxide dissolved in 30 ml. of toluene was then added to the mixture, and the mixture was heated an additional 3 hours at 98° C. The solvent and unreacted monomers were evaporated at 2 mm. Hg absolute pressure. During this latter operation, the temperature was maintained between 20° C. and 50° C. The resulting liquid interpolymer comprised 212 grams (corresponding to a conversion of 71.4%) and contained 2.04% silicon.

The liquid interpolymer was divided into two portions, A and B, and placed into sheet molds.

Portion A was cured at room temperature for 10 days using 10% $SnCl_4$ in acetic anhydride as a catalyst. After this curing period, the same material was further heat treated at 175° C. for 72 hours.

Portion B was cured at room temperature for 8 days using dibutyltindiacetate as a catalyst. After this curing period, Portion B was further heat treated at 175° C. for 72 hours.

Mechanical properties of the A and B materials were measured after each curing period. The results were as follows:

|  | Portion A | | Portion B | |
|---|---|---|---|---|
|  | R.T. Cure | Post-Cure | R.T. Cure | Post-Cure |
| Tensile | 60 | 246 | 138 | 773 |
| Elongation | 45 | 23 | 60 | 33 |
| Hardness | 34 | 75 | 45 |  |

Example 4

To a flask equipped like the flask used in Example 3, there was added 47.5 grams (0.25 mol) of vinyl triethoxysilane dissolved in 800 ml. of toluene. The solution was heated to 110° C. and 225 grams of ethylacrylate (2.25 mols), 32 grams of butylacrylate (0.25 mol) and 0.50 gram of benzoyl peroxide were added to the solution over a period of 3 hours. When the addition was completed, the pot temperature was lowered to 98° C. and maintained at that temperature for 2 hours. A second addition of 0.25 gram of benzoyl peroxide dissolved in 30 ml. of toluene was then added to the mixture, and the mixture was heated an additional 3 hours at 98° C. The solvent and unreacted monomers were evaporated at 2 mm. Hg absolute pressure. During this latter operation, the temperature was maintained between 20° C. and 50°

C. The resulting liquid interpolymer comprised 214.8 grams and contained 1.39% silicon.

Portions of this material, containing 2.5% dibutyltindiacetate as a catalyst, were cured in the presence of atmospheric moisture and the mechanical properties of the cured material were measured with the following results:

|            | Tensile | Elongation | Hardness |
|------------|---------|------------|----------|
| R.T. Cure  | 78      | 45         | 45       |
| Post-Cure  | 300     | 20         |          |

Example 5

A polymer was prepared using the general method of Example 4. However, 25 grams (0.25 mol) of methyl methacrylate was used instead of the butylacrylate. The resulting liquid interpolymer comprised 199.7 grams (67.1% conversion) and contained 1.96% silicon.

Portions of this material, containing 2.5% of 10% $SnCl_4$ in acetic anhydride, were cured in the presence of atmospheric moisture, and mechanical properties of the cured polymer were measured as follows:

|            | Tensile | Elongation | Hardness |
|------------|---------|------------|----------|
| R.T. Cure  | 55      | 90         | 25       |
| Post-Cure  | 176     | 20         | 80       |

Example 6

A polymer was prepared using the procedure of Example 4. However, 13.25 grams (0.25 mol) of acrylonitrile was used instead of 32 grams of butylacrylate. The resulting liquid interpolymer contained 1.99% silicon and 1.42% nitrogen.

Portions of the material, containing 2.5% dibutyltindiacetate, were cured, and the mechanical properties were found to be as follows:

|            | Tensile | Elongation | Hardness |
|------------|---------|------------|----------|
| R.T. Cure  | 387     | 100        | 42       |
| Post Cure  | 603     | 20         |          |

Example 7

A polymer was prepared using the procedure of Example 4. However, 26 grams (0.25 mol) of styrene were used instead of 32 grams of butylacrylate. The resulting liquid interpolymer contained 1.61% silicon.

Portions of this material containing 2.5% of dibutyltindiacetate were cured in the presence of atmospheric moisture, and mechanical properties of the cured polymer were measured with the following results:

|            | Tensile | Elongation | Hardness |
|------------|---------|------------|----------|
| R.T. Cure  | 175     | 130        | 24       |
| Post-Cure  | 1,313   | 65         | 94       |

Example 8

To a 1-liter, 3-neck, round-bottom flask equipped with a stirrer, thermometer, reflux condenser, and a $CaCl_2$ drying tube, there was added 32.5 grams (0.225 mol) of vinyl dimethyl ethoxysilane dissolved in 800 ml. of toluene. After the solution was heated to 114° C., 250 grams (2.50 mols) of ethylacrylate and 0.50 gram of benzoyl peroxide were added over a two-hour period. The pot temperature was maintained at 95° C. for two additional hours after the addition was completed. A second addition of 0.25 gram of benzoyl peroxide dissolved in 30 ml. of toluene was then added to the mixture, and the mixture was heated three hours at 95° C. The solvent and unreacted monomers were then removed at 1 mm. Hg pressure and 60° C. The resulting polymer comprised 194.3 grams after drying at 40° C. and 1 mm. Hg absolute pressure. This yield was 68.82% of that theoretically possible. The liquid interpolymer product contained 1.01% silicon.

Example 9

A solution of 160 grams (1.25 mols) of butylacrylate, 23.75 grams (0.125 mol) vinyl triethoxysilane, 1.15 grams of benzoyl peroxide was added to 400 ml. of refluxing toluene at 110°–111° C. This addition took place over a two-hour period. When the addition had been completed, the temperature was lowered to 98° C. over a thirty-minute period and maintained at that temperature for one and one-half hours. At the end of this period, 0.58 gram benzoyl peroxide in 15 ml. of toluene was added to the reaction mixture at 98° C. over a three-minute period. The reaction mixture was maintained at 98° C.–102° C. for two hours. Thereupon, the toluene and unreacted monomers were evaporated under vacuum. The resulting liquid interpolymer contained 1.23% silicon. This yield was 79.4% of that theoretically possible.

Example 10

A solution of 288 grams (2.25 mols) of butylacrylate, 47.5 grams (0.25 mol) of vinyl triethoxysilane, 24.5 grams (0.25 mol) of maleic anhydride, and 0.6 gram of benzoyl peroxide was added to 800 ml. of refluxing toluene at 110°–111° C. This addition took place over a two-hour period. When the addition had been completed, the temperature was lowered to 98° C. over a thirty-minute period and maintained at that temperature for one and one-half hours. At the end of this period, 0.3 gram of benzoyl peroxide in 10 ml. of toluene was added to the reaction mixture at 98° C. over a three-minute period. The reaction mixture was maintained at 98° C.–102° C. for two hours. Thereupon, the toluene and unreacted monomers were removed by evaporation under vacuum. The resulting liquid interpolymer contained 1.24% silicon.

A portion of this material containing 3.75% of 10% $SnCl_4$ in acetic anhydride was cured in the presence of atmospheric moisture, and mechanical properties of the cured compound were measured with the following results:

|            | Tensile | Elongation | Hardness |
|------------|---------|------------|----------|
| R.T. Cure  | 35      | 80         | 16       |
| Post-Cure  | 116     | 15         | 59       |

In addition, another portion of the material containing 3% of 10% $SnCl_4$ in acetic anhydride was cured in the presence of atmospheric moisture, and mechanical properties were measured with the following results:

|            | Tensile | Elongation | Hardness |
|------------|---------|------------|----------|
| R.T. Cure  | 58      | 60         | 28       |
| Post-Cure  | 202     | 18         | 71       |

Example 11

A solution of 288 grams (2.25 mols) of butylacrylate, 47.5 grams (0.25 mol) of vinyl triethoxysilane, 26.0 grams (0.25 mol) of styrene, and 0.80 gram of benzoyl peroxide was added to 800 ml. of refluxing toluene at 110°–111° C. This addition took place over a two-hour period. When the addition had been completed, the temperature was lowered to 98° C. over a thirty-minute period and maintained at that temperature for one and one-half hours. At the end of this period, 0.4 gram of benzoyl peroxide and 10 ml. of toluene was added to the reaction mixture at 98° C. over a three-minute period. The reaction mixture was maintained at 98°–102° C. for two hours. Thereupon, the toluene and unreacted monomers were removed by evaporation under vacuum. The resulting liquid interpolymer contained 0.98% silicon.

Portions of this material containing 2.25% of dibutyltindiacetate were cured in the presence of atmospheric moisture, and mechanical properties of the cured material were measured with the following results:

|  | Tensile | Elongation | Hardness |
|---|---|---|---|
| R.T. Cure | 41 | 105 | 9 |
| Post-Cure | 120 | 55 | 42 |

Example 12

To a flask, equipped like the flask described in Example 8, there was added 92 grams (0.484 mol) of vinyl triethoxysilane and 1600 ml. of toluene. The solution was heated to 112° C., whereupon 900 grams of ethylacrylate (9 mols), 104 grams (1 mol) styrene, 11.5 grams of benzoyl peroxide, and 11.45 grams of t-dodecyl mercaptan were added to the solution over a two-hour period. When the addition had been completed, the pot temperature was lowered to 98° C. and maintained at that temperature for an hour. A second addition of 5.70 grams of benzoyl peroxide dissolved in toluene was added to the mixture, and the mixture was heated an additional two hours at 98° C. The solvent and unreacted monomers were evaporated at a pressure of 1 mm. Hg absolute. The temperature of the reactants during this stripping reaction was about 60° C. This procedure yielded 911.0 grams of polymer comprising an 83.1% conversion of the reactants.

A portion of this material was cured without adding a catalyst. The physical properties were as follows:

|  | Tensile | Elongation | Hardness |
|---|---|---|---|
| R.T. Cure | 73 | 170 | 14 |
| Post-Cure | 125 | 95 | 46 |

It is, of course, to be understood that the foregoing examples are intended to be illustrative and that numerous changes can be made in the ingredients, proportions, and conditions set forth therein, without departing from the spirit of the invention as defined in the appended claims.

We claim:

1. An air-curable sealant and caulking composition which is a moisture-free composition consisting essentially of a liquid interpolymer which is a product of the addition polymerization of (A) from 85 to 98 mol percent of ethylenically unsaturated, silicon-free monomeric material, at least one half of which is an elastomer precursor and (B) from 2 to 15 mol percent of at least one monomer which is a silane having attached to the silicon atom thereof (1) an ethylenically unsaturated aliphatic hydrocarbon radical of 1 to 4 carbon atoms, (2) from one to three radicals having sites for cross-linking and selected from the group consisting of acyloxy and alkoxy radicals having 1 to 4 carbon atoms and (3) at most two innocuous hydrocarbon radicals of 1 to 8 carbon atoms as required to make a total of four radicals attached to said silicon atom.

2. A composition as in claim 1 and wherein the silane is vinyl dimethyl exthoxysilane.

3. A composition as in claim 1 and wherein the silane is vinyl triethoxysilane.

4. The sealant and caulking composition of claim 1 in cured form.

5. An air-curable sealant and caulking composition which is a moisture-free composition consisting essentially of a liquid interpolymer which is a product of the addition polymerization of (A) from 85 to 98 mol percent of ethylenically unsaturated, silicon-free monomeric material, at least 75 mol percent of which is a lower alkyl acrylate and (B) from 2 to 15 mol percent of at least one monomer which is a silane having attached to the silicon atom thereof (1) an ethylenically unsaturated aliphatic hydrocarbon radical of 1 to 4 carbon atoms, (2) from one to three radicals having sites for cross-linking and selected from the group consisting of acyloxy and alkoxy radicals having 1 to 4 carbon atoms and (3) at most two innocuous hydrocarbon radicals of 1 to 8 carbon atoms as required to make a total of four radicals attached to said silicon atom.

6. A composition according to claim 5 and wherein said acrylate is ethyl acrylate.

7. A composition according to claim 5 and wherein said acrylate is butyl acrylate.

8. An air-curable sealant and caulking composition which is a moisture-free composition comprising a liquid interpolymer which is a product of the addition polymerization of (A) from 85 to 98 mol percent of ethylenically unsaturated, silicon-free monomeric material, at least 75 mol percent of which is an elastomer precursor and (B) from 2 to 15 mol percent of at least one monomer which is a silane having attached to the silicon atom thereof (1) an ethylenically unsaturated aliphatic hydrocarbon radical of 1 to 4 carbon atoms, (2) from one to three radicals having sites for cross-linking and selected from the group consisting of acyloxy and alkoxy radicals having 1 to 4 carbon atoms and (3) at most two innocuous hydrocarbon radicals of 1 to 8 carbon atoms as required to make a total of four radicals attached to said silicon atom, and a curing catalyst selected from the group consisting of Lewis acids, metal salts of carboxylic acids and alkanedione-metal complexes.

9. The air-curable sealant and caulking composition of claim 8 in cured form.

10. A composition according to claim 8 wherein the radicals having sites for cross-linking are acyloxy and the curing catalyst is a metal salt of a carboxylic acid.

11. A composition according to claim 8 wherein the radicals having sites for cross-linking are alkoxy and the curing catalyst is of the Lewis acid type.

References Cited

UNITED STATES PATENTS

| 2,532,583 | 12/1950 | Tyran | 260—86.1 |
| 2,642,415 | 6/1953 | Winslow | 260—86.1 |
| 2,654,717 | 10/1953 | Rehberg et al. | 260—89.5 |
| 2,865,899 | 12/1958 | Hurwitz et al. | 260—88.1 |

OTHER REFERENCES

Rochow, "Introduction to the Chemistry of the Silicones," John Wiley & Sons, Inc., N.Y. (1951) p. 139; QD 412S6 R6.

Schildknecht, "Vinyl and Related Polymers," John Wiley & Sons, Inc., N.Y. (1959) p. 106.

Chem. ABS., vol. 59 (1963) p. 15491e (Wacker-Chemie), German application 5/1959; date relied on.

JOSEPH L. SCHOFER, *Primary Examiner.*

HARRY WONG, JR., *Assistant Examiner.*

U.S. Cl. X.R.

260—86.1, 80.71, 82.1, 78.5, 88.1, 85.5, 87.5, 87.7, 41, 33.8, 31.8, 30.6, 31.2, 31.6; 204—159.13; 260—33.4; 117—148, 127, 124; 161—193, 217, 218, 250